_(12)_ United States Patent
Tokunaga et al.

(10) Patent No.: US 10,657,960 B2
(45) Date of Patent: May 19, 2020

(54) INTERACTIVE SYSTEM, TERMINAL, METHOD OF CONTROLLING DIALOG, AND PROGRAM FOR CAUSING COMPUTER TO FUNCTION AS INTERACTIVE SYSTEM

(71) Applicant: SHARP KABUSHIKI KAISHA, Sakai, Osaka (JP)

(72) Inventors: Rei Tokunaga, Sakai (JP); Toru Ueda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 19 days.

(21) Appl. No.: 15/761,010

(22) PCT Filed: Jul. 22, 2016

(86) PCT No.: PCT/JP2016/071572
§ 371 (c)(1),
(2) Date: Mar. 16, 2018

(87) PCT Pub. No.: WO2017/051601
PCT Pub. Date: Mar. 30, 2017

(65) Prior Publication Data
US 2018/0277110 A1    Sep. 27, 2018

(30) Foreign Application Priority Data

Sep. 24, 2015 (JP) .................. 2015-187055

(51) Int. Cl.
*G10L 15/22* (2006.01)
*G06F 16/332* (2019.01)
(Continued)

(52) U.S. Cl.
CPC .............. *G10L 15/22* (2013.01); *G06F 16/00* (2019.01); *G06F 16/3329* (2019.01);
(Continued)

(58) Field of Classification Search
CPC .... G06F 17/2785; G06F 17/279; G16H 20/70
See application file for complete search history.

(56) References Cited

U.S. PATENT DOCUMENTS 9,286,643 B2 * 3/2016 Reinders ................ G06Q 50/01
9,679,568 B1 * 6/2017 Taubman ................ G10L 15/22
(Continued)

FOREIGN PATENT DOCUMENTS

JP    2003-141117 A    5/2003
JP    2004-109323 A    4/2004
(Continued)

OTHER PUBLICATIONS

Shi, Lei, and Rossitza Setchi. "Ontology-based personalised retrieval in support of reminiscence." Knowledge-Based Systems 45 (2013): 47-61. (Year: 2013).*

(Continued)

*Primary Examiner* — Brian L Albertalli
(74) *Attorney, Agent, or Firm* — ScienBiziP, P.C.

(57) ABSTRACT

A dialog content is generated using information that is unique to a user and information that is not unique. The processing executed by a dialog system includes a step of identifying a person based on a dialog with a user, a step of acquiring personal information, a step of analyzing the dialog, a step of extracting an event, a step of searching for a local episode and a global episode based on the personal information and the event, a step of generating dialog data using the search result, a step of outputting a dialog, and a step of accepting user evaluation.

9 Claims, 15 Drawing Sheets

(51) Int. Cl.
*G06F 16/00* (2019.01)
*G10L 15/18* (2013.01)
*G06F 40/30* (2020.01)
*G06F 40/211* (2020.01)

(52) U.S. Cl.
CPC ........ *G10L 15/1815* (2013.01); *G06F 40/211* (2020.01); *G06F 40/30* (2020.01); *G10L 2015/223* (2013.01); *G10L 2015/226* (2013.01)

(56) References Cited

U.S. PATENT DOCUMENTS

| | | | | |
|---|---|---|---|---|
| 10,185,544 | B1* | 1/2019 | Mutagi | G06F 3/167 |
| 2004/0006483 | A1 | 1/2004 | Sasaki et al. | |
| 2006/0155765 | A1 | 7/2006 | Takeuchi et al. | |
| 2012/0253818 | A1 | 10/2012 | Owada | |
| 2014/0074464 | A1* | 3/2014 | Berens | G10L 15/22 704/233 |
| 2015/0081299 | A1* | 3/2015 | Jasinschi | A61B 5/165 704/246 |
| 2016/0136384 | A1* | 5/2016 | Cover | A61M 21/02 600/28 |
| 2016/0171387 | A1* | 6/2016 | Suskind | G10L 13/033 706/12 |

FOREIGN PATENT DOCUMENTS

| | | |
|---|---|---|
| JP | 2006-171719 A | 6/2006 |
| JP | 2011-223369 A | 11/2011 |
| JP | 2012-213093 A | 11/2012 |

OTHER PUBLICATIONS

Sarne-Fleischmann, Vardit, et al. "Personalized reminiscence therapy for patients with Alzheimer's disease using a computerized system." Proceedings of the 4th International Conference on PErvasive Technologies Related to Assistive Environments. ACM, 2011. (Year: 2011).*

Lazar, Amanda, Hilaire Thompson, and George Demiris. "A systematic review of the use of technology for reminiscence therapy." Health education & behavior 41.1_suppl (2014): 51S-61S. (Year: 2014).*

Gowans, Gary, et al. "Designing a multimedia conversation aid for reminiscence therapy in dementia care environments." CHI'04 Extended Abstracts on Human Factors in Computing Systems. ACM, 2004. (Year: 2004).*

Bermingham, Adam, et al. "Automatically recommending multimedia content for use in group reminiscence therap." Proceedings of the 1st ACM international workshop on Multimedia indexing and information retrieval for healthcare. ACM, 2013. (Year: 2013).* http://www.sharp.co.jp/cocorobo/products/rxv200-feature.html with English translation of relevant portion marked with pink.

Rei Tokunaga, Entertainment Computing Symposium (EC2015) Sep. 2015 "Effects on the conversation with robot cleaner", Information Processing Society of Japan, Japan.

https://ja.wikipedia.org/wiki/%E5%9B%9E%E6%83%B3%E6%B3%95 with English translation of relevant portion marked with pink.

http://www.izumo-hp.com/coop/recollection.html with English translation of relevant portion marked with pink.

http://www.ninchisho-forum.com/iryou/knowledge/071001_08.html with English translation of relevant portion marked with pink.

* cited by examiner

| ID 310 | WHAT 320 | WHEN 330 | EPISODE 340 | UPDATED DATE 350 |
|---|---|---|---|---|
| G10010 | TOKYO OLYMPIC | 1964/10/10-24 | ① ABEBE TOOK FIRST PRIZE IN MARATHON<br>② ISAO INOKUMA WON GOLD MEDAL IN JUDO<br>③ TOKAIDO SHINKANSEN STARTED OPERATION IMMEDIATELY BEFORE TOKYO OLYMPIC | 2013/10/1 10:00 |
| G10011 | TOKYO OLYMPIC | 2020/7/24-8/9 | ① TOKYO WAS CHOSEN BY VOTING WITH ISTANBUL, TURKEY AND MADRID, SPAIN<br>② CHRISTEL TAKIGAWA, JAPANESE TELEVISION ANNOUNCER, GAVE PRESENTATION IN THE TOKYO OLYMPIC BIDDING CAMPAIGN, AND "OMOTENASHI" SHE TALKED ABOUT IN THE SPEECH RECEIVED ATTENTION. | 2015/8/1 15:23 |
| G10501 | DORAEMON | 2005/4/15 | ① VOICE ACTRESS FOR TV CARTOON DORAEMON WAS REPLACED. | 2013/10/1 10:00 |
| G12450 | SEISHUN AMIIGO | 2005 | ① 'SEISHUN AMIIGO' BY SHUJI AND AKIRA WAS BEST SELLER OF THE YEAR. | 2013/10/1 10:00 |
| G29135 | Y2K PROBLEM | 2000/1/1 | ① Y2K PROBLEM –COMPUTER MALFUNCTIONS IN THE YEAR OF 2000– RECEIVED ATTENTION BUT NO MAJOR PROBLEM AROSE. | 2013/10/1 10:00 |

| USER NAME | ID | OUTPUT COUNT | EVALUATION VALUE | MOST RECENT OUTPUT DATE |
|---|---|---|---|---|
| ITTETSU | 10010-① | 4 | 6 | 2015/8/2 19:45 |
| ITTETSU | 29135-① | 3 | 1 | 2014/9/12 10:23 |
| RIE | 10501 | 2 | 5 | 2015/4/4 16:23 |

| ID 510 | WHO 520 | INPUT DATE 530 | WHEN 540 | EPISODE 550 | OUTPUT COUNT 560 | EVALUATION VALUE 570 | MOST RECENT OUTPUT DATE 580 |
|---|---|---|---|---|---|---|---|
| L1001 | ITTETSU | 2014/2/12 19:30 | 2014/2/12 | GOT 30 CM OF SNOW AND WAS LATE FOR WORK | 10 | 7 | 2015/1/29 21:40 |
| L1002 | ITTETSU | 2015/6/7 22:00 | 2015/6/7 | WEIGHED 68 KG | 3 | −1 | 2015/3/2 19:45 |
| L1003 | ITTETSU | 2014/3/1 10:23 | CHILDHOOD | RIVER OFTEN FLOODED IN RAINY AND TYPHOON SEASONS AND HOUSES WERE FLOODED BELOW FLOOR LEVEL. | 2 | 3 | 2015/1/2 19:45 |
| L1004 | ITTETSU | 2011/4/5 | 18〜22 | ATTENDED KYUICHI UNIVERSITY | 3 | 4 | 2014/1/5 19:45 |
| L5001 | RIE | 2014/6/12 17:23 | 2014/6/12 | RECEIVED INFORMAL JOB OFFER FROM M MOTOR CO., LTD. | 3 | 3 | 2015/4/1 19:45 |
| L5002 | RIE | 2014/3/12 20:12 | 2014/3/11 | PANCAKES IN MAUI TASTED GOOD | 10 | 8 | 2015/3/12 |

FIG.6

| WHO 610 | GENDER 620 | AGE 630 | LOCATION DURING DAY 640 | LIKES① 650 | LIKES② 660 | DISLIKES① 670 | ... |
|---|---|---|---|---|---|---|---|
| ITTETSU | MALE | 60 | MINATO WARD, TOKYO | BASEBALL | HAMBURGER | CHICKEN (FOOD) | ... |
| RIE | FEMALE | 22 | MIHAMA WARD, CHIBA | FASHION | SINGER A | FROGS | ... |

| EVENT | EVENT① | EVENT② | EVENT③ | EVENT④ | EVENT⑤ |
|---|---|---|---|---|---|
| | 2015/06/10 | TV | SINGER | YAMADA A-KO | — |
| EVENT SCORE | 3 | 1 | 2 | 5 | — |

810 — EVENT row
811 — EVENT SCORE row

820

| ID | WHAT | TARGET AGES, DATE | EPISODE | UPDATED DATE |
|---|---|---|---|---|
| G20010 | YAMADA A-KO | 1973–1980 | ① "HITONATSU NO KOI" BECAME HUGE HIT IN 1974<br>② APPEARED IN FILM "TOKYO NO DANCER" IN 1974 | 2013/10/1 10:00 |
| G12501 | JUNE 10 | 6/10 | ① JUNE 10 IS TIME DAY | 2013/10/1 10:00 |

830 — ID
831 — WHAT
832 — TARGET AGES, DATE
833 — EPISODE
834 — UPDATED DATE

FIG.9

| | | EVENT SCORE | AGE SCORE | RECENT TIME PENALTY | OUTPUT DETERMINATION SCORE (ADD UP NUMBERS ON THE LEFT) |
|---|---|---|---|---|---|
| | G20010-① "HITONATSU NO KOI" BECAME HUGE HIT IN 1974 | 5 | 3 | -6 | 2 |
| 910 — | G20010-② APPEARED IN FILM "TOKYO NO DANCER" IN 1974 | 5 | 3 | 0 | 8 |
| | G12501-① JUNE 10 IS TIME DAY | 3 | 1 | 0 | 4 |
| | N21951 SONGS ARE GOOD AND MAKE ME FEEL SO COMFORTABLE. | 0 | 0 | 0 | 0 |

FIG.11

| ID 1110 | WHO 1120 | INPUT DATE 1130 | WHEN 1140 | EPISODE 1150 | OUTPUT COUNT 1160 | EVALUATION INDEX 1170 | MOST RECENT OUTPUT DATE 1180 |
|---|---|---|---|---|---|---|---|
| L1001 | ITTETSU | 2015/6/7 22:00 | 2015/6/7 | WEIGHED 68 KG | 3 | −1 | 2015/3/2 19:45 |
| L1002 | ITTETSU | 2014/3/1 10:23 | CHILDHOOD | RIVER OFTEN FLOODED IN RAINY AND TYPHOON SEASONS AND HOUSES WERE FLOODED BELOW FLOOR LEVEL. | 2 | 3 | 2015/1/2 19:45 |
| L1004 | ITTETSU | 2011/4/5 | 18~22 | ATTENDED KYUICHI UNIVERSITY | 3 | 4 | 2014/1/5 19:45 |

| | | EVENT SCORE | AGE SCORE | RECENT TIME PENALTY | OUTPUT DETERMINATION SCORE (ADD UP NUMBERS ON THE LEFT) |
|---|---|---|---|---|---|
| 1210 — | G20010-① "HITONATSU NO KOI" BECAME HUGE HIT IN 1974 | 5 | 3 | -6 | 2 |
| 1220 — | G20010-② APPEARED IN FILM "TOKYO NO DANCER" IN 1974 | 5 | 3 | 0 | 8 |
| 1230 — | G12501-① JUNE 10 IS TIME DAY | 3 | 1 | 0 | 4 |
| 1240 — | L1001 WEIGHED 68 KG AROUND JUNE 10 LAST YEAR | 10 | 2 | 0 | 11 |
| 1250 — | L1004 ATTENDED KYUICHI UNIVERSITY IN 1974 | 10 | 3 | 0 | 13 |

INTERACTIVE SYSTEM, TERMINAL, METHOD OF CONTROLLING DIALOG, AND PROGRAM FOR CAUSING COMPUTER TO FUNCTION AS INTERACTIVE SYSTEM

TECHNICAL FIELD

The present disclosure relates to a technique for implementing a dialog using a device, and more specifically to a technique for implementing a dialog using information unique to an utterer and general information.

BACKGROUND ART

Interactive robots and home appliances are commercially available (for example, see NPD 1). Dialog has been known to heal fatigue (for example, see NPD 2). NPD 2 indicates that dialog with robot home appliances has the effect of reducing stress and effective especially for elderly people.

Dementia patients have been increasing among elderly people. There is an approach for dementia, called reminiscence therapy (for example, see NPDs 3 to 5). Reminiscence is a psychological therapy proposed by an American psychiatrist, Dr. Robert Butler. It is expected that bringing back memories in the past and sharing memories with someone else stimulates brain and stabilizes the mental state. Having the therapy for a long time has proven to improve the cognitive function, and the therapy has been utilized in rehabilitation of dementia patients also in Japan. In short, this approach allows patients to recall the past mainly through conversation with people and thereby improves the mental state. This approach is often used in therapy for cognition disorder of elderly people and sometimes used in treatment of depression.

Regarding the technique for improving dementia, Japanese Patent Laying-Open No. 2011-223369 (PTD 1) discloses "a conversation system for a patient with cognitive dementia that detects a smiling face of the patient with cognitive dementia and provides a suitable conversation corresponding thereto" (see [Abstract]). The technique disclosed in PTD 1 implements a system capable of selectively providing a conversation that attracts the patient's interest by counting the number of times a smiling face is detected according to a conversation data group in a dialog device for dementia patients.

Japanese Patent Laying-Open No. 2004-109323 (PTD 2) discloses "a voice interaction apparatus which can change spoken contents according to the state of interaction with a user as occasion may demand and realize intellectual and natural sound dialog" (see [Abstract]).

CITATION LIST

Patent Document

PTD 1: Japanese Patent Laying-Open No. 2011-223369
PTD 2: Japanese Patent Laying-Open No. 2004-109323

Non Patent Document

NPD 1: http://www.sharp.co.jp/cocorobo/products/rxv200-feature.html
NPD 2: "Entertainment Computing Symposium (EC2015)" September, 2015 "Effects on the conversation with robot cleaner"
NPD 3: https://ja.wikipedia.org/wiki/%E5%9B%9E%E6%83%B3%E6%B3%95
NPD 4: http://www.izumo-hp.com/coop/recollection.html
NPD 5: http://www.ninchisho-forum.com/iryou/knowledge/071001_08.html

SUMMARY OF INVENTION

Technical Problem

In everyday life, we experience a sense of familiarity when talking about not only sick and fatigue but also topics rooted in our experiences. If such a function is implemented, a system capable of more friendly interaction can be provided. For example, a dialog "Do you remember B Park in front of A Elementary School? We played a lot in B Park when we were elementary school kids" gives a sense of familiarity.

NPDs 3 to 5 are premised on that reminiscence is a therapy method given to people by people and do not suppose machine intervention.

The technique disclosed in PTD 1 enhances the therapy effect by detecting a patient's smiling face during conversation and selecting the topics that attracts the patient's interest. Here, overall conversation is evaluated but learning new is not considered.

In the technique disclosed in PTD 2, both of a scenario and a vocabulary that are not included in dialog scenarios are stored so that a dialog about the stored scenario can be performed for the next time. However, only the contents learned in the system will be subjects of a dialog for the next time, and no other elements are learned.

As described above, there exists no system that creates a dialog by combining personal information and global information. Therefore, there is a demand for generating a dialog by combining information that is unique to an individual with information that is not unique to a certain individual (global information).

The present disclosure is made in order to solve the problem as described above. An object according to an aspect is to provide a dialog system for implementing a dialog based on information that is unique to an individual and information that is not unique to an individual.

An object according to another aspect is to provide a method for controlling a computer such that a dialog is implemented based on information that is unique to an individual and information that is not unique to an individual.

An object according to another aspect is to provide a terminal for implementing a dialog based on information that is unique to an individual and information that is not unique to an individual.

An object according to yet another aspect is to provide a program for controlling a computer such that a dialog is implemented based on information that is unique to an individual and information that is not unique to an individual.

Solution to Problem

According to an embodiment, a dialog system is provided. The dialog system includes: an episode storage unit for storing episodes; a personal information storage unit for storing user information; a person identifying unit for identifying a user having a dialog with the dialog system; an extraction unit for extracting one or more events related to the dialog from the dialog with the user and extracting an episode related to the extracted one or more events from the episode storage unit; a generation unit for generating a dialog content suitable for the identified user, based on the extracted episode and personal information of the identified user; and an output unit for outputting the generated dialog content.

According to an aspect, since a dialog suitable for the user is implemented, the effects such as healing fatigue, alleviating depression symptoms, and enhancing familiarity can be achieved.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 3 is a diagram conceptually illustrating an embodiment of storage of data in global episode storage unit 224.

FIG. 4 is a diagram conceptually illustrating an embodiment of storage of data in global episode storage unit 224.

FIG. 5 is a diagram conceptually illustrating an embodiment of storage of data in local episode storage unit 223.

FIG. 6 is a diagram conceptually illustrating an embodiment of storage of data in personal information storage unit 225.

FIG. 8 is a diagram illustrating the result of dialog analysis and part of data stored in global episode storage unit 224.

FIG. 9 is a diagram illustrating the score of each global episode.

FIG. 11 is a diagram conceptually illustrating a data structure generated by the dialog system according to another aspect.

FIG. 12 is a diagram illustrating the scores for each episode generated by the dialog system according to another aspect.

DESCRIPTION OF EMBODIMENTS

Embodiments of the present invention will be described below with reference to the drawings. In the following description, the same components are denoted with the same reference signs. Their names and functions are also the same. Therefore, a detailed description thereof will not be repeated.

[Usage of Home-Appliance System]

Figure 1:
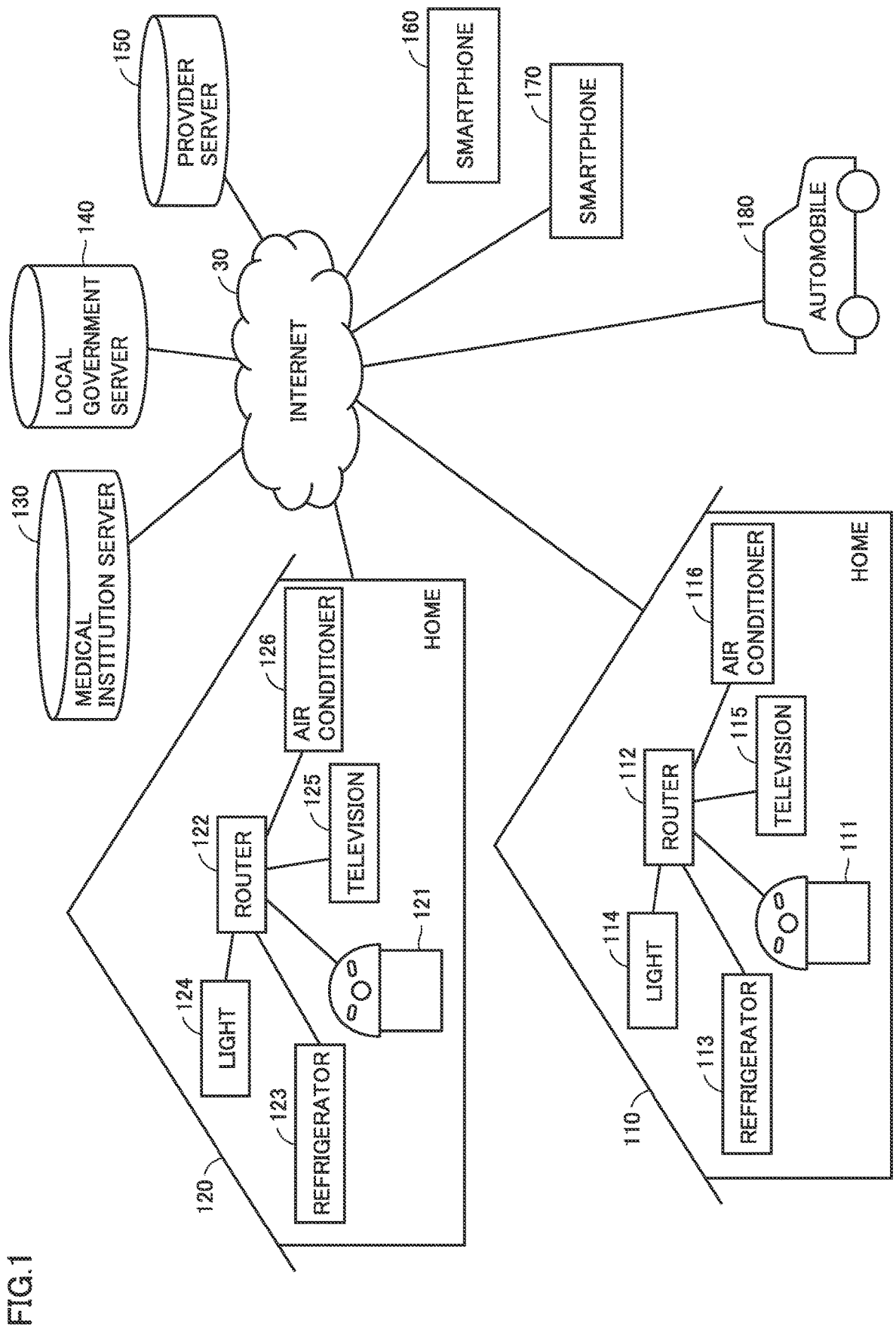
FIG. 1 is a diagram illustrating an aspect of use of an interactive home appliance system.

Referring to FIG. 1, the technical concept according to the present embodiment will be described. FIG. 1 is a diagram illustrating an aspect of use of an interactive home-appliance system. In an aspect, the home-appliance system is implemented as cleaning robots 111, 121, which are an embodiment of the home appliance.

At the user's own home 110, cleaning robot 111 is connected to be able to communicate with each of a refrigerator 113, a light 114, a television 115, and an air conditioner 116 through a router 112. Refrigerator 113, light 114, television 115, and air conditioner 116 each have a network function and execute a unique operation based on a signal sent from cleaning robot 111. Examples of the unique operation may include the processing of displaying the contents of refrigerator 113, the processing of adjusting the luminance of light 114, the processing of adjusting channels and volume of television 115, and temperature control of air conditioner 116.

Home 110 is connected to the Internet 30. To the Internet 30, someone else's home 120, a medical institution server 130, a local government server 140, a provider server 150, smartphones 160, 170, and an automobile 180 are further connected to be able to communicate.

Someone else's home 120 is, for example, the house of a relative of the resident of home 110. Cleaning robot 121 is present in home 120. Cleaning robot 121 is connected to be able to communicate with each of a refrigerator 123, a light 124, a television 125, and an air conditioner 126 through a router 122. Refrigerator 123, light 124, television 125, and air conditioner 126 have the similar functions as refrigerator 113, light 114, television 115, and air conditioner 116, respectively. Therefore, a detailed description thereof will not be repeated.

Medical institution server 130 is used, for example, by a hospital or other medical institutions that the user himself/herself or his/her family or relative visits. Local government server 140 is used by the local government of the residence of the user himself/herself or his/her family or relative. Provider server 150 is operated and used by an information provider for transmitting information to each of cleaning robots 111, 211. Medical institution server 130, local government server 140, and provider server 150 are each implemented, for example, by a computer device having a well-known configuration.

Smartphones 160, 170 are used as information processing communication terminals by the user's family or the members of a provider that provides the user himself/herself with medical service. The information processing communication terminals are not limited to smartphones, and tablet terminals, PDAs (Personal Digital Assistants), or other terminals may be used by the family or the members of the provider. The configuration of smartphones 160, 170 is easily understood by those skilled in the art. Therefore, a description of the configuration will not be repeated.

Automobile 180 has a network communication function and may be controlled by cleaning robots 111, 121 and other equipment having the communication function.

[Configuration of Interactive System]

Figure 2:
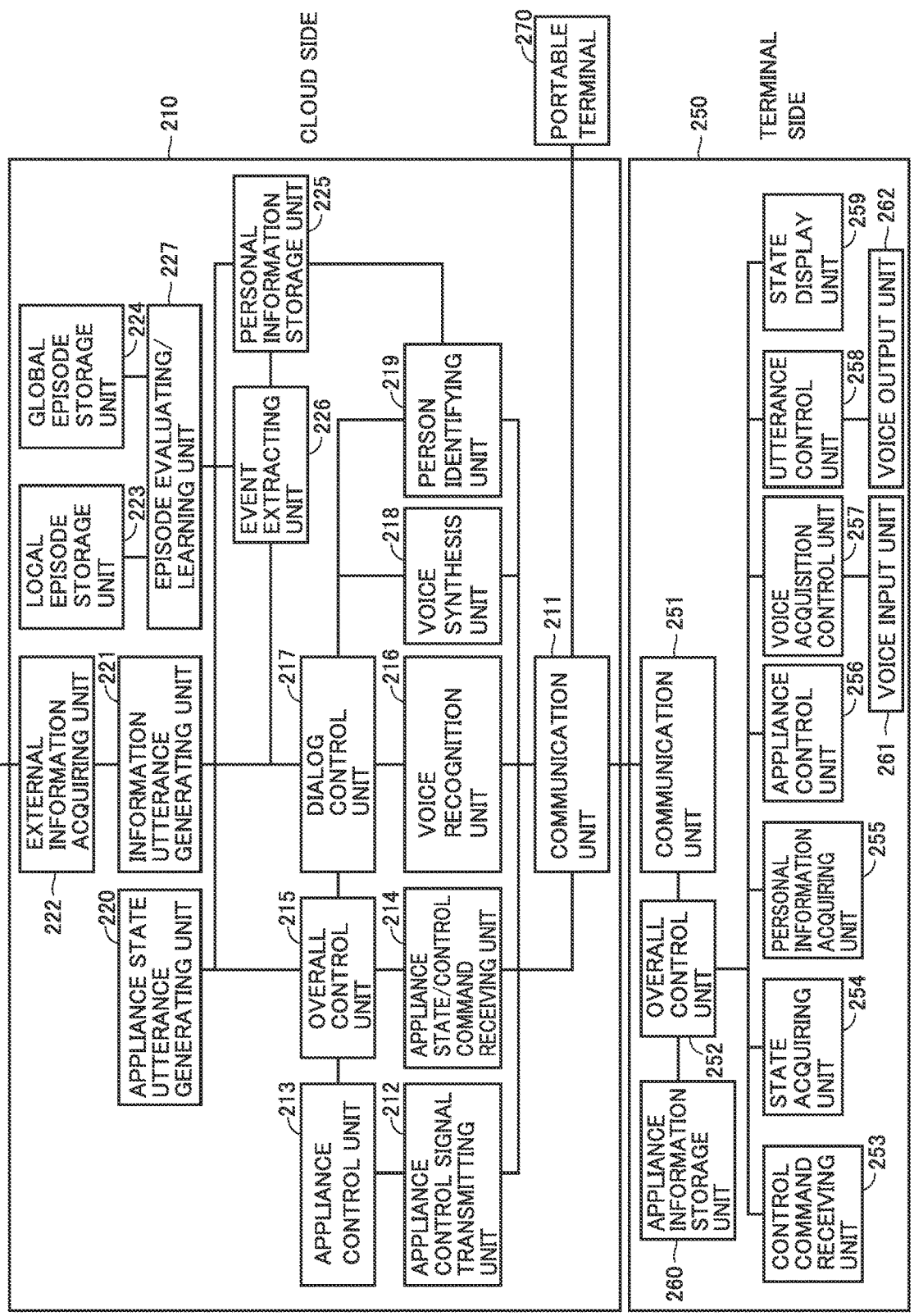
FIG. 2 is a block diagram illustrating a configuration of a dialog system 20.

Referring to FIG. 2, a configuration of a dialog system 20 according to the present embodiment will be described. FIG. 2 is a block diagram illustrating a configuration of dialog system 20. In an aspect, dialog system 20 includes a server 210 and a home appliance 250.

In an embodiment, server 210 includes a communication unit 211, an appliance control signal transmitting unit 212, an appliance control unit 213, an appliance state/control command receiving unit 214, an overall control unit 215, a voice recognition unit 216, a dialog control unit 217, a voice synthesis unit 218, a person identifying unit 219, an appliance state utterance generating unit 220, an information utterance generating unit 221, an external information acquiring unit 222, a local episode storage unit 223, a global episode storage unit 224, a personal information storage unit 225, an event extracting unit 226, and an episode evaluating/learning unit 227.

In an aspect, server 210 is implemented, for example, by a computer having a well-known configuration. In server 210, communication unit 211 includes, for example, an interface for communicating with home appliance 250. Appliance control signal transmitting unit 212 generates a signal for controlling home appliance 250 and transmits the signal to home appliance 250 through communication unit 211.

Appliance control unit 213 is configured to control home appliance 250 when a preset condition is established or when an instruction is received. The condition is, for example, that an event extracted from a dialog is an event unique to the operation of home appliance 250. The instruction may be transmitted by another information communication terminal (for example, cleaning robots 111, 121, smartphone 160) capable of communicating with server 210.

Appliance state/control command receiving unit 214 receives a command for controlling home appliance 250 from an external service. For example, appliance state/control command receiving unit 214 receives a voice signal for allowing cleaning robot 111 to utter. In another aspect, appliance state/control command receiving unit 214 receives a signal indicating the appliance state transmitted by home appliance 250.

Overall control unit 215 controls the operation of server 210. In another aspect, overall control unit 215 controls the operation of home appliance 250 and other home appliances capable of communicating with the server, based on a signal applied to server 210.

Voice recognition unit 216 analyzes the voice signal received from home appliance 250 and recognizes the meaning based on the analysis result. The voice signal includes, for example, a signal indicating the conversation of the user or the driver with the cleaning robot 111 or automobile 180.

Dialog control unit 217 controls an utterance given to home appliance 250 and a dialog with an utterer. More specifically, dialog control unit 217 selects the content of utterance to be output by home appliance 250 next time, from a database prepared in advance, based on the result of recognition by voice recognition unit 216, and transmits data (voice signal, identification number of utterance, and the like) for implementing the selected utterance to home appliance 250. In selecting, for example, a recognition result by voice recognition unit 216 is subjected to syntax analysis and meaning analysis to be matched with a meaning in the databased prepared in advance, and a response sentence for the corresponding meaning is selected. In a simplified process, the recognition result may be matched with a hiragana character string in the database, a character string with a smaller edit distance may be selected, and a response sentence may be selected stochastically from a plurality of responses corresponding to the selected character string. In another aspect, the content of utterance to be output by home appliance 250 may be selected from the dialog history accumulated through dialogs with dialog system 20.

Voice synthesis unit 218 generates voice to be uttered by home appliance 250, based on a signal sent from dialog control unit 217. The generated signal is then sent to home appliance 250 through communication unit 211.

Person identifying unit 219 determines whether the user of home appliance 250 is a user registered in advance in server 210, based on a signal received from home appliance 250 or based on data provided from an external service. The result of the determination is sent to dialog control unit 217. Dialog control unit 217 controls a dialog with the user through home appliance 250, based on the result of the determination.

Appliance state utterance generating unit 220 generates a content to be uttered by home appliance 250, in accordance with the state of home appliance 250. The state is specified based on an instruction given to home appliance 250.

Information utterance generating unit 221 generates a content to be uttered by home appliance 250, based on data sent from an external service. For example, information utterance generating unit 221 includes an utterance of home appliance 250 for asking about the health, an utterance for asking about the user's feeling temperature, and an utterance for asking about the user's action (for example, whether the user watched TV).

External information acquiring unit 222 acquires information from an external service providing information. The acquired information is, for example, news in the past. The news may be acquired for each category, for example, sports, arts, community, business, and politics. The acquired news may be an internal storage device in server 210 or an external storage device.

Local episode storage unit 223 stores local episodes. In the present embodiment, the local episodes refers to information familiar to the user that is remembered only by the user, the user's family or friends, or others. An example of the local episode is, for example, "A attended B Elementary School from 1990 to 1995". In the present embodiment, local episode storage unit 223 stores, for example, an event appearing in a dialog between dialog system 20 and the user. In another aspect, external information acquiring unit 222 accesses another information device on a network that server 210 is connected to, acquires a local episode based on information existing in schedule, notepad, mails of the information device, and stores the acquired local episode into local episode storage unit 223. In the present embodiment, local episode storage unit 223 is implemented as, for example, a flash memory, a hard disk, or other nonvolatile data storage devices. In another aspect, local episode storage unit 223 may be implemented as an external data storage device connected to server 210.

Global episode storage unit 224 stores global episodes. In the present embodiment, the global episodes refers to an event widely remembered on the Internet or the like. Whether the event is remembered by the user does not matter. In the present embodiment, global episode storage unit 224 is implemented as, for example, a flash memory, a hard disk, or other nonvolatile data storage devices. In another aspect, global episode storage unit 224 may be implemented as an external data storage device connected to server 210.

In an aspect, to store a global episode, a global event database is constructed in advance, and an event corresponding to a certain event is acquired from the database. The global event database can be accessed by server 210 through a network.

For example, for an item "Tokyo Olympic", the following knowledge may be accumulated.
(item 1) Tokyo Olympic (1964) the opening ceremony on Oct. 10, 1964, the closing ceremony on October 24
(event 1) Abeve won a gold medal in marathon. Isao Inokumna won a gold medal in Judo heavyweight.
(event 2) Japan won 16 gold medals.

(event 3) Tokaido Shinkansen started operation immediately before Tokyo Olympic.
(event 4) October 10 was thereafter established as a national holiday called Sports Day.
(item 2) Tokyo Olympic (2020) will be held from Jul. 24 to Aug. 9, 2020.
(event 1) Chosen by voting with Istanbul, Turkey and Madrid, Spain.
(event 2) Christel Takigawa, Japanese television announcer, gave a presentation in the Tokyo Olympic bidding campaign, and "Omotenashi" she talked about in the speech received attention.

As another method, for example, information as described above may be dynamically generated by searching knowledge on the Internet such as Wikipedia.

Output in connection with this event is a text based on the fact associated with the event (example: "Abebe won a marathon gold medal in the Tokyo Olympic in 1964"). In addition, Tokyo Olympic March (music) or Olympic opening ceremony video associated therewith may be stored and output.

Personal information storage unit 225 stores personal information of the user who uses dialog system 20. An example of the personal information is name, address, and other information for specifying the user. In the present embodiment, the personal information is not limited to those described above and may include, for example, information such as the user's hobbies and preferences.

Event extracting unit 226 extracts one or more events related to the dialog from the dialog with the user and extracts an episode related to the extracted one or more events from local episode storage unit 223 or global episode storage unit 224.

Episode evaluating/learning unit 227 evaluates an episode based on a predefined evaluation criterion and calculates an evaluation value. The episode to be evaluated is, for example, the episode extracted by event extracting unit 226. Episode evaluating/learning unit 227 associates an evaluation value with the episode. The associated evaluation value is stored into local episode storage unit 223 or global episode storage unit 224. Episode evaluating/learning unit 227 further associates an event included in dialog output in the past with the episode to learn the episode stored in server 210.

The functions implemented by server 210 may be implemented by one or more processors, an instruction for implementing the configuration, and a communication interface. In an aspect, the functions may be implemented by a combination of software such as program modules and a processor. In another aspect, part or all of the functions may be implemented by hardware such as circuit elements for implementing the functions.

[Configuration of Home Appliance]

Referring to FIG. 2 again, home appliance 250 includes a communication unit 251, an overall control unit 252, a control command receiving unit 253, a state acquiring unit 254, a personal information acquiring unit 255, an appliance control unit 256, a voice acquisition control unit 257, an utterance control unit 258, a state display unit 259, an appliance information storage unit 260, a voice input unit 261, and a voice output unit 262.

Communication unit 251 is configured to be able to communicate with communication unit 211 of server 210. Overall control unit 252 controls the operation of home appliance 250. Control command receiving unit 253 accepts input of operation by the user of home appliance 250. In another aspect, control command receiving unit 253 receives a control signal sent from server 210.

State acquiring unit 254 acquires the state of operation of home appliance 250. As used herein, the state refers to an internal operation status of the appliance (for example, the washing machine is rinsing, the television is receiving the program "xxx") and, in addition, a state that can be acquired by the appliance such as a temperature sensor. The acquired information may be transmitted by overall control unit 252 from communication unit 251 to server 210.

Personal information acquiring unit 255 acquires personal information of the user of home appliance 250, based on operation or input to home appliance 250. The personal information may include the user's voice print, face image, fingerprint, and other biological information unique to the user, and the user's name and other character information. In an aspect, personal information acquiring unit 255 may be implemented by a microphone and a voice recognition processing program for acquiring the user's voice print. In another aspect, personal information acquiring unit 255 may be implemented by a camera and a face recognition program. In yet another aspect, personal information acquiring unit 255 may be implemented by a fingerprint sensor.

Appliance control unit 256 operates based on a signal sent from server 210. The operation of home appliance 250 is controlled in accordance with control of overall control unit 252. In another aspect, appliance control unit 256 executes the operation or an operation predefined for each content in response to the operation or the content of utterance by the user of home appliance 250.

Voice acquisition control unit 257 acquires the user's utterance to home appliance 250 and performs voice processing of the utterance to acquire a voice signal. Voice acquisition control unit 257 transmits the acquired signal to overall control unit 252. Overall control unit 252 may transmit the content of utterance given to home appliance 250 to server 210 through communication unit 251.

Utterance control unit 258 executes utterance in response to an instruction by server 210, based on a signal received by communication unit 251. In another aspect, utterance control unit 258 may implement an initial question by cleaning robot 111 or other home appliance 250 based on a dialog scenario prepared in advance.

State display unit 259 executes display indicating the operation of home appliance 250, based on an instruction from overall control unit 252. The display may include, for example, display with an LED (Light Emitting Diode) or display on a liquid crystal monitor. The content of the display may include display indicating that home appliance 250 is performing a usual home appliance function, display indicating having a dialog with the user, and display indicating that home appliance 250 starts a dialog with the user and the operation mode is a mode of diagnosing the state of stress or fatigue.

Appliance information storage unit 260 holds information of home appliance 250. The information may include, for example, the name, product number, and other identification information of home appliance 250, the identification information of the registered user, and the operation start date.

Voice input unit 261 accepts input of voice to home appliance 250. An electrical signal corresponding to the input voice is input to voice acquisition control unit 257. Voice input unit 261 is implemented as, for example, a built-in microphone or a voice input terminal.

Voice output unit 262 outputs voice based on a signal sent from utterance control unit 258. Voice output unit 262 is implemented as, for example, a speaker or a voice output terminal.

[Data Structure]

Referring to FIG. 3 and FIG. 4, the data structure of dialog system 20 will be described. FIG. 3 and FIG. 4 are diagrams conceptually illustrating an embodiment of storage of data in global episode storage unit 224.

As shown in FIG. 3, global episode storage unit 224 holds items 310 to 350. More specifically, item 310 is the ID of a global episode. Item 320 is the name of the global episode. Item 330 represents the date when the global episode happened. Item 340 includes the content of the global episode. In the present embodiment, for the global episode specified by item 320, a plurality of contents may be included in item 340. The data form of global episodes may be any of voice, music, video, and text.

Item 350 includes the date when the record specified by the ID of item 310 is updated.

As shown in FIG. 4, global episode storage unit 224 further includes items 410 to 450. Item 410 is the user name. Item 420 is the ID of a global episode. Item 430 is the number of times the global episode is output from server 210 to be used in a dialog. Item 440 is an evaluation value. The evaluation value is calculated for each global episode, based on a predetermined criterion. Item 450 is the date of the last output.

The data shown in FIG. 4 is generated using user information held in personal information storage unit 225. The manner of holding the number of times a global episode is output for each user is not limited to the manner illustrated in FIG. 4. For example, the data may be held as a relational database in a separate storage region and extracted as necessary.

FIG. 5 is a diagram conceptually illustrating an embodiment of storage of data in local episode storage unit 223. Local episode storage unit 223 includes items 510 to 580.

Item 510 shows the ID of a local episode. Item 520 represents the user associated with the local episode. Item 530 represents the date when the local episode is input to server 210. Item 540 represents the time when the local episode actually happened. Item 550 represents the specific content of the local episode. Item 560 represents the number of times the local episode is output. Item 570 represents the evaluation value of the local episode. Item 580 represents the date when the local episode is output most recently.

FIG. 6 is a diagram conceptually illustrating an embodiment of storage of data in personal information storage unit 225. Personal information storage unit 225 includes items 610 to 670.

Item 610 represents the name of a user. Item 620 represents the gender of the user. Item 630 represents the age of the user. Item 640 represents the domicile of the user. Item 650 represents a first preference of the user's preferences. Item 660 represents a second preference of the user's preferences. Item 660 represents a third preference of the user's preferences. Any other preferences may be associated with the user.

[Control Structure]

Figure 7:
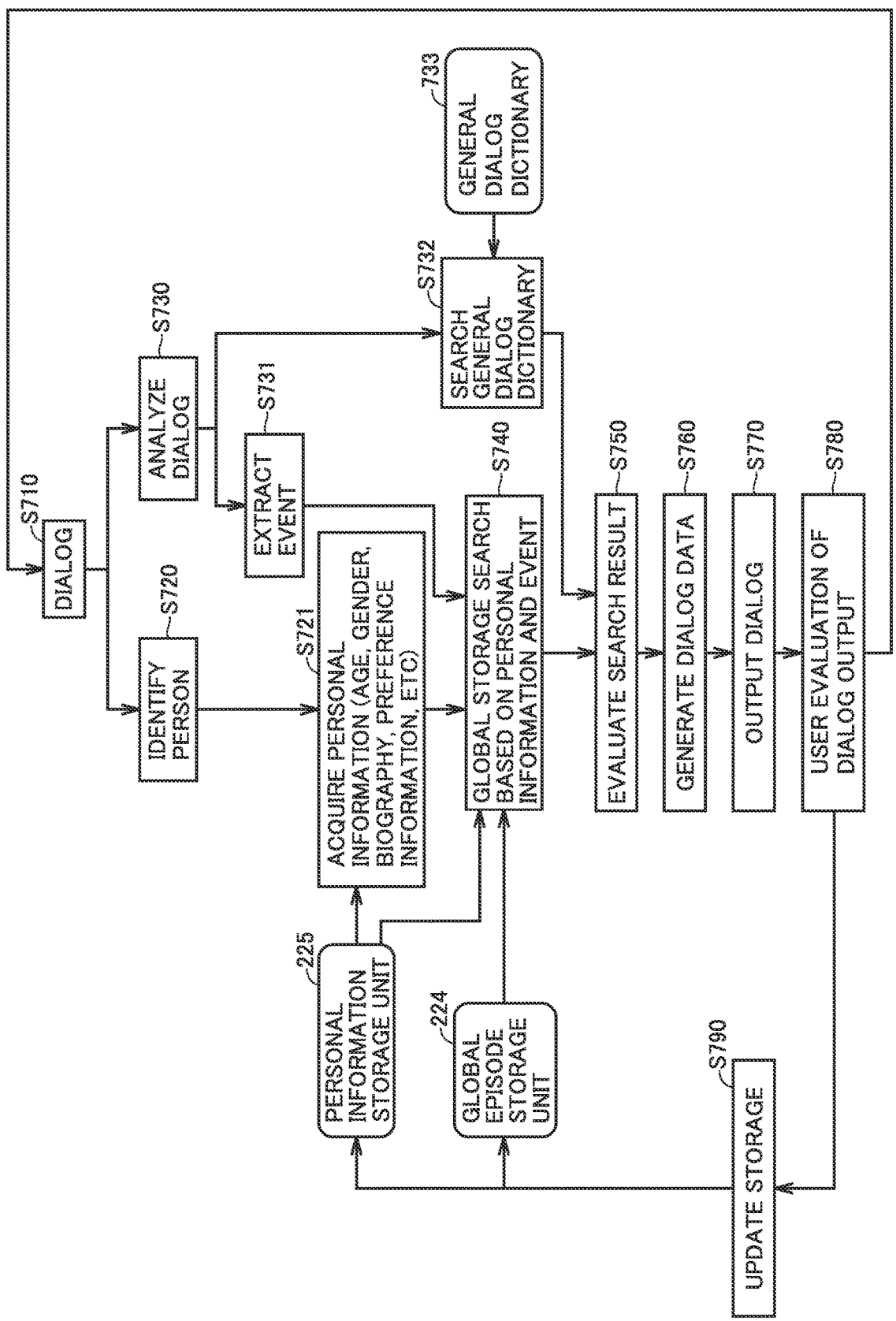
FIG. 7 is a flowchart illustrating part of the processing executed by dialog system 20.

Referring to FIG. 7, the control structure of dialog system 20 according to the present embodiment will be described. FIG. 7 is a flowchart illustrating part of the processing executed by dialog system 20.

In step S710, dialog system 20 has a dialog with a user. For example, server 210 has a dialog with the user of home appliance 250. When the user gives an utterance to home appliance 250, home appliance 250 transmits a signal representing the utterance to communication unit 211 of server 210 through communication unit 251. In server 210, voice recognition unit 216 executes voice recognition processing based on the signal.

In step S720, server 210 identifies the user. More specifically, person identifying unit 219 specifies the user who has uttered, based on the result of the voice recognition processing and the information stored in personal information storage unit 225. If the information obtained from the utterance is stored in personal information storage unit 225, person identifying unit 219 determines that the user is registered in dialog system 20. On the other hand, if the information is not stored in personal information storage unit 225, person identifying unit 219 determines that the user is not registered in dialog system 20.

In step S721, server 210 acquires the personal information for the specified user from personal information storage unit 225. For example, dialog control unit 217 reads the age, gender, biography, preferences, and other information of the user from personal information storage unit 225.

In step S730, server 210 analyzes the dialog with the user. For example, dialog control unit 217 acquires the contents of the dialog based on the output of voice recognition unit 216 and acquires data such as proper noun, date, and other data that may characterize the contents of the dialog as an event. The data acquired by dialog control unit 217 is used by event extracting unit 226.

In step S731, server 210 extracts an event from the analyzed dialog. For example, event extracting unit 226 extracts an event using the data output from dialog control unit 217 (for example, proper noun, date, and other data).

In step S732, server 210 searches for a general dialog pattern based on the result of dialog analysis in step S730, using a general dialog dictionary 733. General dialog dictionary 733 is stored in a nonvolatile region of server 210 in advance.

In step S740, server 210 searches for an episode based on the acquired personal information and the extracted event. For example, using the personal information acquired by dialog control unit 217 and the event extracted by event extracting unit 226, episode evaluating/learning unit 227 searches global episode storage unit 224 for a global episode related to the personal information and the event. If the search result is not found, event extracting unit 226 may search general dialog dictionary 733 for an episode.

In step S750, server 210 evaluates the search result. For example, episode evaluating/learning unit 227 calculates an evaluation value of the global episode in accordance with a predetermined evaluation criterion, for each of one or more global episodes obtained through the search.

In step S760, server 210 generates dialog data. For example, dialog control unit 217 generates dialog data for responding to the user's utterance, using the global episode obtained using the result of voice recognition by voice recognition unit 216 and a dialog template prepared in advance for general dialog.

In step S770, server 210 outputs a dialog. More specifically, dialog control unit 217 transmits the dialog data generated in step 760 to home appliance 250 through communication unit 211. When home appliance 250 receives the dialog data through communication unit 251, utterance control unit 258 outputs voice based on the dialog data through voice output unit 262. Here, state display unit 259 may display a screen to prompt for input of user evaluation for the output voice. Alternatively, voice acquisition control unit 257 becomes ready for accepting input of a voice signal from voice input unit 261.

In step S780, server 210 accepts input of user evaluation for the output voice. For example, if the user of home appliance 250 performs touch operation to give evaluation of the content of the output voice on the screen appearing on state display unit 259, a signal representing the evaluation is sent from communication unit 251 to server 210. The evaluation is performed based on, for example, in five grades, or whether a message icon representing evaluation as is used in SNS is pressed.

In another aspect, dialog system 20 may accept evaluation of the dialog content in the form of voice. Examples of phrases for evaluation and evaluation values are as follows.

| (phrase) | (evaluation value) |
|---|---|
| Awesome | 10 |
| Great | 10 |
| Got it | 7 |
| Sure | 5 |
| Okay | 5 |
| No | 0.1 |
| Unregistered | 1 |
| No response | 1 |

The evaluation value associated with each phrase can be changed by the administrator of the dialog system.

In step S790, server 210 updates the related information of the global episode by associating the user evaluation input in step S780 with the global episode in global episode storage unit 224.

The evaluation of the search result in step S750 may be performed after step S760.

Referring to FIG. 8, the output by dialog system 20 will be described. FIG. 8 is a diagram illustrating the result of dialog analysis and part of data stored in global episode storage unit 224. Interactive system 20 generates a table 800 and a table 820 in a work region of a memory, based on the result of extraction by event extracting unit 226. In the example below, the search result of dialog system 20 in a case where the user of dialog system 20 (Ittetsu, age 60) utters "Singer Yamada A-ko appeared on TV today" will be described.

Table 800 includes items 810, 811. Item 810 represents the extracted event. Item 811 represents the score of the event. In the present embodiment, the score is an index indicating the degree of characteristics that the target (the extracted event) has. Here, the higher score indicates that the target is a characteristic word. There are various methods for calculating the characteristic, and a method called TF-TDF is typically used. In this method, a numerical value can be allocated to each word in advance. Preferably, server 210 stores a word dictionary and a score in pair. For an event of time, for example, a preset value is allocated to the event, for example, the day is given 4, the week is given 3, the month is given 2, and the season is given 1. The score of the event can be changed according to the settings.

In the example shown in FIG. 8, in an aspect, dialog system 20 extracts four events (event (1) to event (4)) in response to the utterance from the user.

Table 820 includes items 830 to 834. Item 830 represents the identification number of a global episode. Item 831 represents an event included in the global episode. Item 832 represents the date information associated with the event. The date information may include, for example, the day when the event occurred for the first time, the date when the event has meaning, and the period related to the event. Item 833 represents one or more specific episodes associated with the event. Item 834 represents the date when the data record of the global episode is last updated.

Referring to FIG. 9, the evaluation of a global episode will be described. FIG. 9 is a diagram illustrating the scores of global episodes. For each of the global episodes, an output determination score is calculated based on event score, age score, and recent time penalty. The recent time penalty is used for decreasing the priority of the episode.

The event score corresponds to the value shown in item 811 in FIG. 8. The age score is derived, for example, by the following criterion.

$Y$=user age−(present year−target center age)

[In the case where there is a target age]
When Y<0, S=0; when Y=0, S=1; when 5<Y, S=2; when 12<Y<23, S=3 (if there is an overlap, the expression on the right side is applied.)
[No Target Age]
S=1 (for example, Time Day (June 10)).

The recent time penalty (P) is defined, for example, as follows, based on the relation with the period (T (days)) since the last talk with the user about the event. If the utterance of the event is given for the first time (initial value), P=0; if T≤90, P=−2; if T≤30, P=−4; if T≤14, P=−6; if T≤7, P=−8.

This relation is defined considering that when the user hears again the utterance that the user has heard recently, the degree of nostalgia is smaller than other utterances.

In the present embodiment, the general dictionary includes a knowledge base for dialogs. The configuration of the general dictionary can be easily understood by those skilled in the art and a detailed description thereof will not be repeated. In an aspect, the score of the general dictionary may always be set to zero. As for the search result of the general dictionary, one or more search results may be selected, and the recent time penalty may be set. When no corresponding search result is found as a result of search in global episode storage unit 224, a dialog sentence generated from the general dictionary is used.

[Evaluation]

The evaluation of utterance of dialog system 20 will be described. After dialog system 20 gives an utterance in response to the user's utterance, the user may further give an utterance. Based on this utterance, server 210 evaluates the utterance between dialog system 20 and the user.

For example, dialog system 20 utters "Do you remember Yamada A-ko appeared in the film "Tokyo no dancer" in 1974? I missed those days." In response to this utterance, the user responds "I missed those days".

Server 210 of dialog system 20, recognizing the user's response (I missed those days), evaluates the response based on a predetermined evaluation criterion. For example, server 210 gives a positive evaluation to the user's response (I missed those days).

There are a variety of methods for evaluating the user's utterance (voice) or text (characters). For example, server 210 may hold plus (positive) and minus (negative) for each word in a dictionary in advance and evaluate the entire sentence as a sum of the evaluation values of the words. Alternatively, server 210 may assign a positive or negative evaluation value to an utterance or a text as a whole and learn the evaluation function by learning.

Server 210 functions as episode evaluating/learning unit 227 to update the contents of global episode storage unit 224.

Specifically, it is assumed that a point is added to (positive) or deducted from (negative) "evaluation index" of global episode storage unit 224. Although a numerical value of the evaluation index is not considered in the output determination score above, episode evaluating/learning unit 227 may calculate the final output determination score by "multiplying" or "adding" the evaluation index, so that a dialog output preferred by the user is more likely to be selected in response to the user's feedback.

The learning in local episode storage unit 223 is performed similarly. Episode evaluating/learning unit 227 may store a new episode into local episode storage unit 223 or global episode storage unit 224, based on the utterance input by the user or based on the information acquired by external information acquiring unit 222.

For example, if the user utters "I graduated from ABC Elementary School", dialog system 20 responds "You attended ABC Elementary School". If the user gives a reply to acknowledge the response (for example, "yeah" or "yes") to dialog system 20, server 210 functions as episode evaluating/learning unit 227 to store the local episode "attended ABC Elementary School" into local episode storage unit 223.

Figure 10:
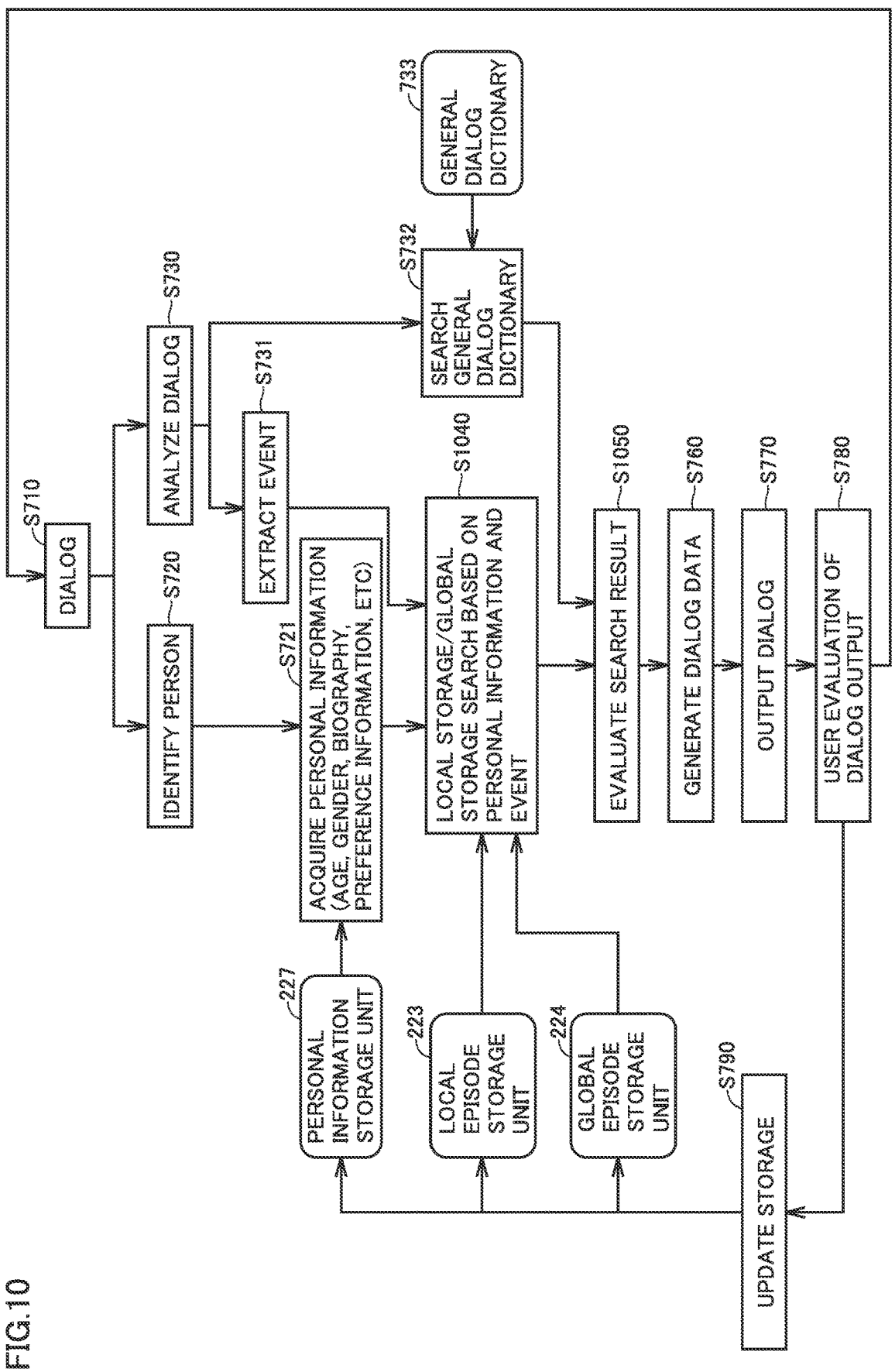
FIG. 10 is a flowchart illustrating part of the processing executed by the dialog system according to another aspect.

Referring now to FIG. 10, another aspect will be described. The dialog system according to another aspect differs from dialog system 20 in that global episodes as well as local episodes are searched.

FIG. 10 is a flowchart illustrating part of the processing executed by the dialog system according to another aspect. The dialog system according to another aspect differs from the control structure of dialog system 20 in that step S1040 is executed in place of step S740. The dialog system according to another aspect has a configuration similar to, for example, the configuration of dialog system 20 shown in FIG. 2. The configuration of dialog system 20 is then incorporated herein by reference as necessary to describe the dialog system according to another aspect.

In step S1040, server 210 included in the dialog system according to another aspect searches for an episode based on the acquired personal information and the extracted event. For example, episode evaluating/learning unit 227 searches global episode storage unit 224 and local episode storage unit 223 for a global episode and a local episode related to the personal information and the event, using the personal information acquired by dialog control unit 217 and the event extracted by event extracting unit 226. If the search result of global episode or local episode is not found, event extracting unit 226 may search general dialog dictionary 733 for an episode.

In step S1050, server 210 evaluates the search result. For example, for each of the one or more global episodes and local episodes obtained by the search, episode evaluating/learning unit 227 calculates the evaluation values of the global episode and the local episode in accordance with a predetermined evaluation criterion.

Referring to FIG. 11 and FIG. 12, output of the dialog system according to this aspect will be described. FIG. 11 is a diagram conceptually illustrating a data structure generated by the dialog system according to another aspect. The dialog system generates a table 1100. Table 1100 includes items 1110 to 1180. Item 1110 indicates the ID that identifies a local episode. Item 1120 represents a user. Item 1130 indicates the date when the episode is input. Item 1140 indicates the time that the episode belongs to. Item 1150 represents the content of the episode. Item 1160 represents the number of times the episode is output (used for a dialog). Item 1170 indicates an evaluation index. Item 1180 represents the date of the last output.

FIG. 12 is a diagram illustrating the scores for each episode generated by the dialog system according to another aspect. The dialog system generates a table 1200. Table 1200 includes records 1210 to 1250 for each of global episodes and local episodes. For example, records 1210 to 1230 include scores for global episodes. Records 1240, 1250 include scores for local episodes. The data structure of scores of each of global episodes and local episodes is not limited to the manner shown in FIG. 12.

Figure 13:
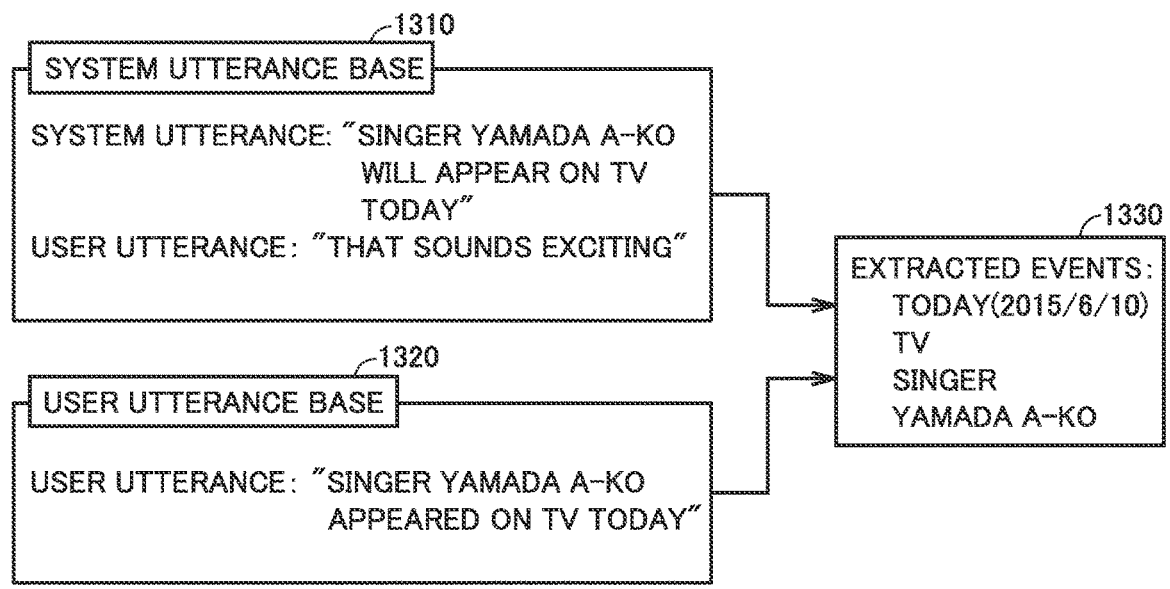
FIG. 13 is a diagram conceptually illustrating a manner in which an event is extracted from a system utterance and a user utterance.

Referring to FIG. 13, an extraction example of events will be described. FIG. 13 is a diagram conceptually illustrating a manner in which an event is extracted from a system utterance and a user utterance.

In the case of a system utterance base 1310, first, the dialog system utters "Singer Yamada A-ko will appear on TV today". In response to the utterance, the user utters "That sounds exciting". The dialog system determines that the utterance by the user is positive and extracts events from the content of the utterance by the dialog system itself. The extracted event 1330 includes today (Jun. 10, 2015), TV, singer, and Yamada A-ko.

On the other hand, in the case of a user utterance base 1320, the user gives an utterance to the dialog system "Singer Yamada A-ko appeared on TV today". The dialog system, recognizing the utterance by the user, extracts today (Jun. 10, 2015), TV, singer, and Yamada A-ko as events. The extracted events are the same as the events extracted in the case of system utterance base 1310.

Figure 14:
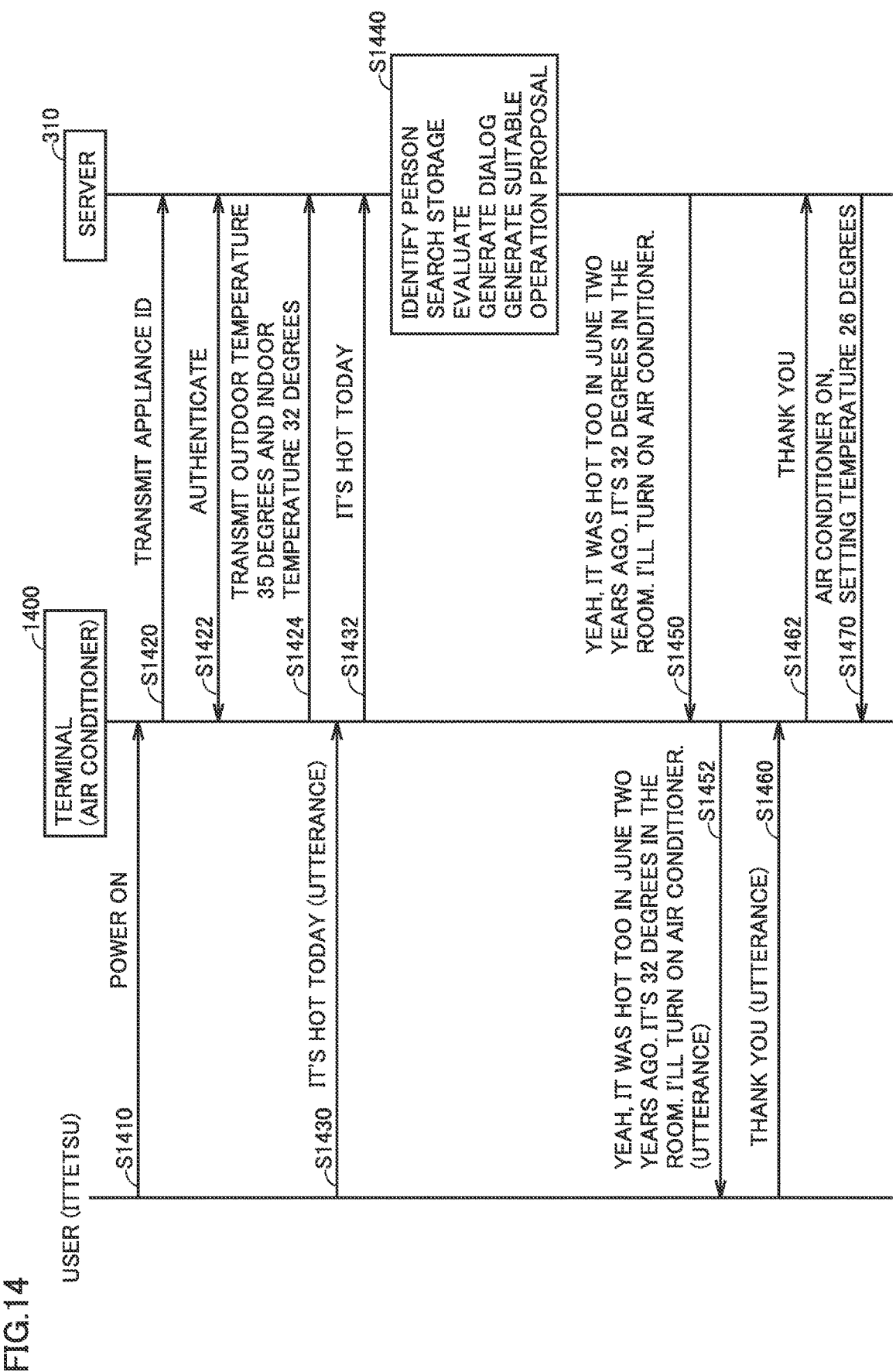
FIG. 14 is a sequence chart illustrating the processing executed by the terminal and the server.

Referring to FIG. 14, the synchronization between the terminal and the server included in the dialog system will be described. FIG. 14 is a sequence chart illustrating the processing executed by the terminal and the server. The terminal is an air conditioner 1400 having a voice recognition function and a communication function, by way of example. The air conditioner and server 210 are connected to be able to communicate.

In an aspect, in step S1410, the user (Ittetsu) powers on air conditioner 1400. In step S1420, air conditioner 1400 transmits the appliance ID of the air conditioner to server 210. In S1422, air conditioner 1400 and server 210 execute authentication processing. If it is determined that air conditioner 1400 is registered as a terminal included in the dialog system, server 210 notifies air conditioner 1400 that the authentication is successful. Air conditioner 1400, receiving the notification, transmits initial information to server 210. The initial information includes, for example, outdoor temperature (35 degrees Celsius) and indoor temperature (32 degrees Celsius). Furthermore, server 210 and air conditioner 1400 start a voice dialog session.

In S1430, the user gives an utterance to air conditioner 1400, for example, "It's hot today".

In step S1432, air conditioner 1400, recognizing the utterance, transmits a signal including a similar content "It's hot today" to server 210. The signal may be either a voice signal or text information.

In S1440, in response to receiving the signal including the utterance from air conditioner 1400, server 210 performs personal identification, searches for an episode, makes an evaluation, generates a dialog, and generates a proposal of operation corresponding to the user's utterance. For example, when home appliance 250 is an air conditioner, the proposal of operation includes, for example, switch on/off, increasing or reducing the setting temperature, and the setting of air volume. When home appliance 250 is a cleaning robot, the proposal includes a question such as "Do you want cleaning?".

In S1450, server 210 transmits a signal for responding to the user's utterance to air conditioner 1400. The signal includes a voice signal or text information for uttering, for example, "Yeah, it was hot too in June two years ago. It's 32 degrees in the room. I'll turn on the air conditioner."

In S1452, air conditioner 1400, receiving the signal from server 210, utters "Yeah, it was hot too in June two years ago. It's 32 degrees in the room. I'll turn on the air conditioner." from a speaker (not shown).

In S1460, the user utters "Thank you". In step S1462, air conditioner 1400, recognizing the utterance, transmits a signal including the utterance to server 210. Server 210, receiving the signal, executes voice recognition processing and meaning analysis processing to determine that the user's utterance is positive for control of the operation of air conditioner 1400.

In S1470, server 210 turns on the air conditioner based on the result of the determination and transmits a control signal to air conditioner 1400 to set the setting temperature to a predetermined temperature (for example, 26 degrees Celsius).

Figure 15:
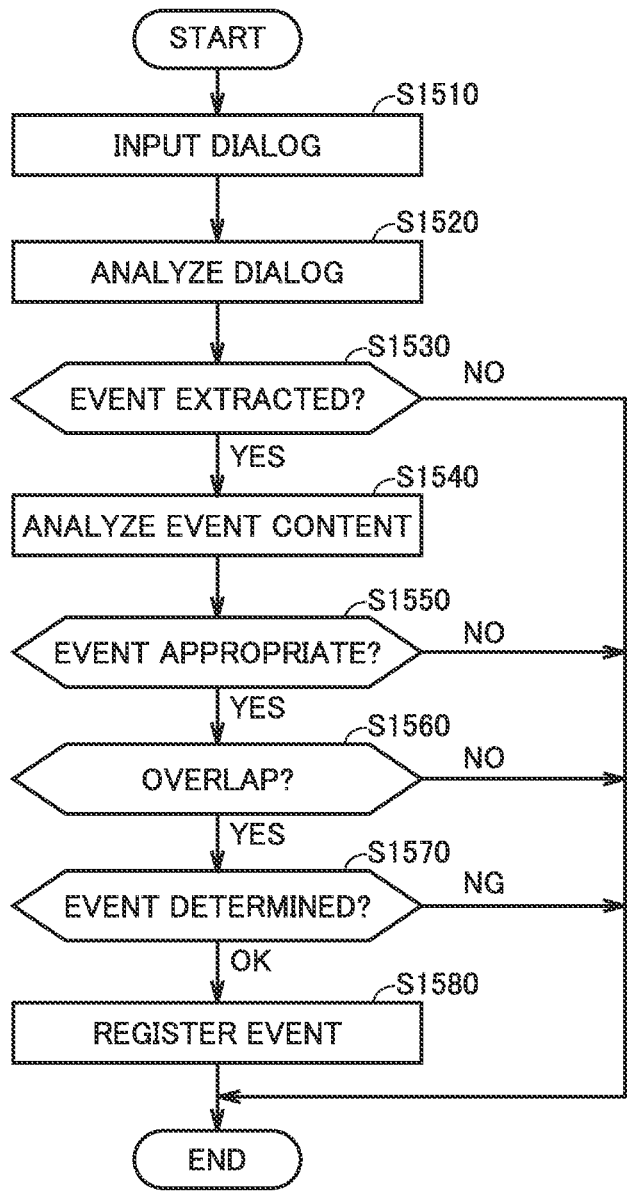
FIG. 15 is a flowchart illustrating part of the processing executed by the dialog system to learn an event in connection with a local episode.

Referring to FIG. 15, learning of an event in the dialog system will be described. FIG. 15 is a flowchart illustrating part of the processing executed by the dialog system to learn an event in connection with a local episode.

In step S1510, the dialog system accepts input of a dialog. For example, when the user (Rie) utters "I can't wait for the athletic meet tomorrow", home appliance 250 accepting the utterance transmits a signal including the utterance to server 210. Server 210 performs voice recognition processing of the utterance.

In step S1520, server 210 executes dialog analysis processing. For example, server 210 extracts words "tomorrow", "athletic meet" and "can't wait".

In step S1530, server 210 determines whether an event has been extracted, based on the result of the dialog analysis processing. For example, server 210 determines whether an event has been extracted, based on whether the extracted words relate to an event prepared in advance. If server 210 determines that an event has been extracted (YES in step S1530), the control switches to step S1540. If not (NO in step S1540), server 210 terminates the processing.

In step S1540, server 210 analyzes the content of the extracted event. Specifically, server 210 acquires the name, time, location, etc. of the event.

In step S1550, server 210 determines whether the content of the event is appropriate.

In step S1560, server 210 determines whether there is an overlap.

In step S1570, server 210 recognizes whether the event is OK.

In step S1580, server 210 registers the event.

(SUMMARY)

In an aspect, the technical concept according to the present disclosure is implemented by a general computer having a well-known configuration as a dialog system. The computer includes a memory, a processor, and an output interface. The memory stores episodes as an episode storing module. The memory further stores user information as a personal information storage module. The processor identifies the user having a dialog with the dialog system. The processor extracts one or more events related to the dialog from the dialog with the user and extracts an episode related to the extracted one or more events from the episode storage unit. The processor, as a generation module, generates a dialog content suitable for the identified user, based on the extracted episode and the personal information of the identified user. The output interface outputs the generated dialog content.

In another aspect, the memory stores global events and local events. The processor extracts a global episode and a local episode related to the extracted one or more events. The processor, as an episode evaluation module, evaluates the extracted global episode and local episode. The processor generates a dialog content suitable for the user, based on at least one of the global episode and the local episode and the personal information of the identified user, based on the result of the evaluation.

In another aspect, the processor, as an evaluation acquisition module, accepts input of user evaluation for the output dialog content. The memory is configured to store the episode as learning of the episode, based on the evaluation.

Preferably, the episode includes at least one of voice, music, video, and text.

In another aspect, the dialog system includes a terminal having a communication function. The processor is configured to generate a dialog content suitable for the user, additionally based on the kind of the terminal. The kind of the terminal, for example, corresponds to the kind of home appliances. Examples of the home appliances may include cleaning robot, air conditioner, light, cooker, television, and other appliances.

In another aspect, the terminal includes a device performing operation under an instruction. The device includes, for example, the home appliances described above. The processor generates a dialog content having an instruction to control operation of the device. The instruction includes operation instruction, stop instruction, setting temperature up, setting temperature down, light on or off, lighting up or down, cooker on or off, television on or off.

In another aspect, a terminal configured to connect to the dialog system described above is implemented. The terminal includes a memory for storing terminal information that identifies the terminal, a transmission circuit for transmitting the terminal information to the dialog system, and a processor for controlling the operation in accordance with a dialog content output from the dialog system. Examples of the terminal include cleaning robot, air conditioner, light, cooker, television, refrigerator, and other home appliances.

In another aspect, a method of controlling a dialog by a computer is provided. This method is implemented by a processor of the computer. More specifically, this method includes the steps of: preparing an episode read from a nonvolatile storage device; reading user information from the nonvolatile storage device and loading the user information into a work region; identifying a user having a dialog with the dialog system; extracting one or more events related to the dialog from the dialog with the user and extracting an episode related to the extracted one or more events; generating a dialog content suitable for the identified user, based on the extracted episode and personal information of the identified user; and outputting the generated dialog content.

In yet another aspect, a program for causing a computer to control a dialog is provided. The program causes the computer to execute the steps of: preparing an episode; preparing user information; identifying a user having a dialog with the dialog system; extracting one or more events related to the dialog from the dialog with the user and extracting an episode related to the extracted one or more events; generating a dialog content suitable for the identified user, based on the extracted episode and personal information of the identified user; and outputting the generated dialog content.

As described above, the present embodiment can implement a dialog suited for a user and achieve the effects such as heeling fatigue, alleviating depression symptoms, and enhancing a sense of familiarity.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

REFERENCE SIGNS LIST 20 dialog system, 30 Internet, 110, 120 home, 111, 121 cleaning robot, 112, 122 router, 113, 123 refrigerator, 114, 124 light, 115, 125 television, 116, 126, 1400 air conditioner, 130 medical institution server, 140 local government server, 150 provider server, 160, 170 smartphone, 180 automobile, 210 server, 211, 251 communication unit, 212 appliance control signal transmitting unit, 213, 256 appliance control unit, 214, 253 control command receiving unit, 215, 252 overall control unit, 216 voice recognition unit, 217 dialog control unit, 218 voice synthesis unit, 219 person identifying unit, 220 appliance state utterance generating unit, 221 information utterance generating unit, 222 external information acquiring unit, 223 local episode storage unit, 224 global episode storage unit, 225 personal information storage unit, 226 event extracting unit, 227 learning unit, 250 home appliance, 254 state acquiring unit, 255 personal information acquiring unit, 257 voice acquisition control unit, 258 utterance control unit, 259 state display unit, 260 appliance information storage unit, 261 voice input unit, 262 voice output unit, 733 general dialog dictionary, 800, 820, 1100, 1200 table, 1210, 1230, 1240, 1250 record, 1310 system utterance base, 1320 user utterance base.

The invention claimed is:

1. A dialog system comprising:
an episode storage unit for storing episodes;
a personal information storage unit for storing user information;
a person identifying unit for identifying a user having a dialog with the dialog system based on a result of a voice recognition process and the user information stored in the personal information storage unit;
an extraction unit for extracting one or more events related to the dialog from the dialog with the user and extracting an episode related to the extracted one or more events from the episode storage unit;
an episode evaluation unit for making an evaluation of the extracted episode, the evaluation being performed in accordance with a predefined criterion;
a generation unit for generating a dialog content suitable for the identified user, based on the extracted episode, personal information of the identified user, and a result of the evaluation; and
an output unit for outputting the generated dialog content.

2. The dialog system according to claim 1, wherein
the episode storage unit includes
a global episode storage unit for storing global events and a local episode storage unit for storing local events,
the extraction unit extracts a global episode and a local episode related to the extracted one or more events, and
the generation unit generates a dialog content suitable for the user, based on at least one of the global episode and the local episode and personal information of the identified user, based on the result of the evaluation.

3. The dialog system according to claim 1, further comprising an evaluation acquisition unit for accepting input of user evaluation for the dialog content output by the output unit,
wherein the episode storage unit is configured to learn the episodes based on the evaluation.

4. The dialog system according to claim 1, wherein the episodes include at least one of voice, music, video, and text.

5. The dialog system according to claim 1, wherein
the output unit further includes a terminal having a communication function, and
the generation unit is configured to generate a dialog content suitable for the user, additionally based on the kind of the terminal.

6. The dialog system according to claim 5, wherein
the terminal includes a device performing operation under an instruction, and
the generation unit generates a dialog content having an instruction to control operation of the device.

7. A terminal configured to connect to the dialog system of claim 1, comprising:
a storage unit for storing terminal information that identifies the terminal;
a transmission unit for transmitting the terminal information to the dialog system; and
a control unit for controlling operation in accordance with a dialog content output from the dialog system.

8. A method of controlling a dialog by a computer, comprising:
preparing episodes;
preparing user information;
identifying a user having a dialog with a dialog system, based on a result of voice recognition and the user information;
extracting one or more events related to the dialog from the dialog with the user and extracting an episode related to the extracted one or more events;
making an evaluation of the extracted episode, the evaluation being performed in accordance with a predefined criterion;
generating a dialog content suitable for the identified user, based on the extracted episode, personal information of the identified user, and a result of the evaluation; and
outputting the generated dialog content.

9. A non-transitory computer-readable medium comprising program instructions for causing a computer to control a dialog,
the instructions causing the computer to execute:
preparing episodes;
preparing user information;
identifying a user having a dialog with a dialog system, based on a result of voice recognition and the user information;
extracting one or more events related to the dialog from the dialog with the user and extracting an episode related to the extracted one or more events;
making an evaluation of the extracted episode, the evaluation being performed in accordance with a predefined criterion;
generating a dialog content suitable for the identified user, based on the extracted episode, personal information of the identified user, and a result of the evaluation; and
outputting the generated dialog content.

* * * * *